(12) United States Patent
Ramsey

(10) Patent No.: US 9,376,344 B2
(45) Date of Patent: Jun. 28, 2016

(54) FOAMED GLASS CERAMIC COMPOSITE MATERIALS AND A METHOD FOR PRODUCING THE SAME

(75) Inventor: W. Gene Ramsey, Las Cruces, NM (US)

(73) Assignee: Earthstone International, LLC, Santa Fe, NM (US)

(*) Notice: Subject to any disclaimer, the term of this patent is extended or adjusted under 35 U.S.C. 154(b) by 926 days.

(21) Appl. No.: 11/276,193

(22) Filed: Feb. 17, 2006

(65) Prior Publication Data

US 2007/0194476 A1 Aug. 23, 2007

(51) Int. Cl.
*C04B 14/24* (2006.01)
*C04B 18/14* (2006.01)
*C04B 28/04* (2006.01)
*C04B 38/08* (2006.01)

(52) U.S. Cl.
CPC .............. *C04B 14/24* (2013.01); *C04B 18/141* (2013.01); *C04B 28/04* (2013.01); *C04B 38/08* (2013.01); *Y02W 30/94* (2015.05)

(58) Field of Classification Search
CPC .... C04B 14/24; C03C 11/007; C03C 10/0063
USPC ................. 264/41, 42, 43, 603, 605, 606, 44; 65/19–21.4, 20, 22
See application file for complete search history.

(56) References Cited

U.S. PATENT DOCUMENTS

| 2,484,911 | A | * | 10/1949 | Seil .............................. 432/109 |
| 2,514,324 | A | | 7/1950 | Ford |
| 2,620,597 | A | | 12/1952 | Ford |
| 2,955,049 | A | | 10/1960 | Booth |
| 3,056,184 | A | | 10/1962 | Blaha |
| 3,174,870 | A | * | 3/1965 | Connelly et al. ................ 501/84 |
| 3,348,933 | A | | 10/1967 | Schulz |
| 3,432,580 | A | | 3/1969 | Heidrich et al. |

(Continued)

FOREIGN PATENT DOCUMENTS

| CN | 1285335 A | 8/2006 |
| JP | 09110549 | 4/1997 |

(Continued)

OTHER PUBLICATIONS

Chandra, Satish et al., Lightweight Aggregate Concrete, 2002, Noyes Publications, p. 22.*

(Continued)

*Primary Examiner* — Scott W Dodds
(74) *Attorney, Agent, or Firm* — C. John Brannon; Brannon Sowers & Cracraft PC

(57) ABSTRACT

A method of making a foamed glass composite, including crushing a vitreous precursor material, such as waste glass, frit, metallurgical slag or the like, sizing the crushed vitreous precursor to segregate an amount of crushed particles of a predetermined size and pelletizing the crushed particles. The pellets are preheated and passed through a high-temperature flame to foam the pellets. The foamed pellets are air-quenched to a temperature below their dilatometric softening point and then cooling to room temperature. The foamed pellets are then mixed with Portland cement and water to form a composite material. The flame temperature is at least about 1300° C. and the pellets are preheated to within no more than about 25° C. of their dilatometric softening point. The pellets have a volume of between about 0.05 and about 1 cubic centimeter and reside in the flame for between about 0.5 to about 10 seconds.

13 Claims, 1 Drawing Sheet

(56) References Cited

U.S. PATENT DOCUMENTS

| | | | |
|---|---|---|---|
| 3,443,920 A | 5/1969 | Overcashier | |
| 3,505,089 A * | 4/1970 | Rostoker | 501/84 |
| 3,527,587 A | 9/1970 | Velev et al. | |
| 3,532,480 A | 10/1970 | D'Eustachio | |
| 3,574,583 A | 4/1971 | Goldsmith | |
| 3,585,014 A | 6/1971 | Malesak | |
| 3,607,170 A | 9/1971 | Malesak | |
| 3,870,496 A | 3/1975 | Cutler | |
| 3,874,861 A | 4/1975 | Kurz | |
| 3,945,816 A * | 3/1976 | Johnson | C03C 11/005 65/22 |
| 3,963,503 A | 6/1976 | Mackenzie | |
| 3,967,704 A | 7/1976 | Ogden | |
| 3,972,667 A | 8/1976 | Han usa | |
| 4,038,063 A | 7/1977 | Williams et al. | |
| 4,043,719 A | 8/1977 | Jones | |
| 4,050,873 A | 9/1977 | Brunlik et al. | |
| 4,059,423 A * | 11/1977 | De Vos et al. | 65/21.2 |
| 4,081,259 A * | 3/1978 | Bassin et al. | 65/21.4 |
| 4,086,098 A * | 4/1978 | Le Ruyet et al. | 106/668 |
| 4,124,365 A | 11/1978 | Williams et al. | |
| 4,143,202 A * | 3/1979 | Tseng et al. | 428/406 |
| 4,190,416 A | 2/1980 | North | |
| 4,198,224 A * | 4/1980 | Kirkpatrick | 65/22 |
| 4,212,635 A | 7/1980 | North | |
| 4,274,825 A | 6/1981 | North | |
| 4,289,521 A | 9/1981 | Scymura | |
| 4,797,319 A | 1/1989 | Yoshida et al. | |
| 4,826,788 A | 5/1989 | Dennert et al. | |
| 4,871,395 A | 10/1989 | Sugama | |
| 4,933,306 A | 6/1990 | Pietsch | |
| 4,981,820 A | 1/1991 | Renlund et al. | |
| 4,992,321 A | 2/1991 | Kandachi et al. | |
| 5,193,764 A | 3/1993 | Larratt | |
| 5,326,382 A | 7/1994 | Oat | |
| 5,393,342 A | 2/1995 | Hooykaas | |
| 5,516,351 A | 5/1996 | Solomon et al. | |
| 5,605,570 A | 2/1997 | Bean et al. | |
| 5,711,801 A | 1/1998 | Chatterji et al. | |
| 5,716,910 A | 2/1998 | Totten et al. | |
| 5,821,184 A | 10/1998 | Haines et al. | |
| 5,885,025 A | 3/1999 | Angley | |
| 5,902,068 A | 5/1999 | Angley | |
| 5,972,817 A | 10/1999 | Haines et al. | |
| 5,983,671 A | 11/1999 | Haines et al. | |
| 6,616,752 B1 * | 9/2003 | Basura et al. | 106/716 |
| 6,616,873 B1 * | 9/2003 | Duraiswami et al. | 264/44 |
| 6,726,400 B1 | 4/2004 | Angley | |
| 6,776,237 B2 | 8/2004 | Dao et al. | |
| 7,905,678 B2 | 3/2011 | Rastegar | |
| 8,002,495 B2 | 8/2011 | Rastegar | |
| 8,171,751 B1 | 5/2012 | Ungerleider | |
| 8,579,542 B2 | 11/2013 | Narmo | |
| 2003/0097857 A1 * | 5/2003 | Oei | B09B 3/005 65/20 |
| 2007/0194476 A1 | 8/2007 | Ramsey | |
| 2012/0057931 A1 | 3/2012 | Narmo | |
| 2013/0020437 A1 | 1/2013 | Valentini et al. | |

FOREIGN PATENT DOCUMENTS

| | | |
|---|---|---|
| JP | 09124378 | 5/1997 |
| JP | 2004238214 | 8/2004 |
| RU | 2145315 | 2/2000 |
| RU | 2149853 | 5/2000 |
| RU | 2203252 | 4/2003 |
| WO | 9009355 | 8/1990 |

OTHER PUBLICATIONS

Production of Lightweight Aggregates and Its Properties, William Andrew Publishing, 2002, pp. 21-22.

* cited by examiner

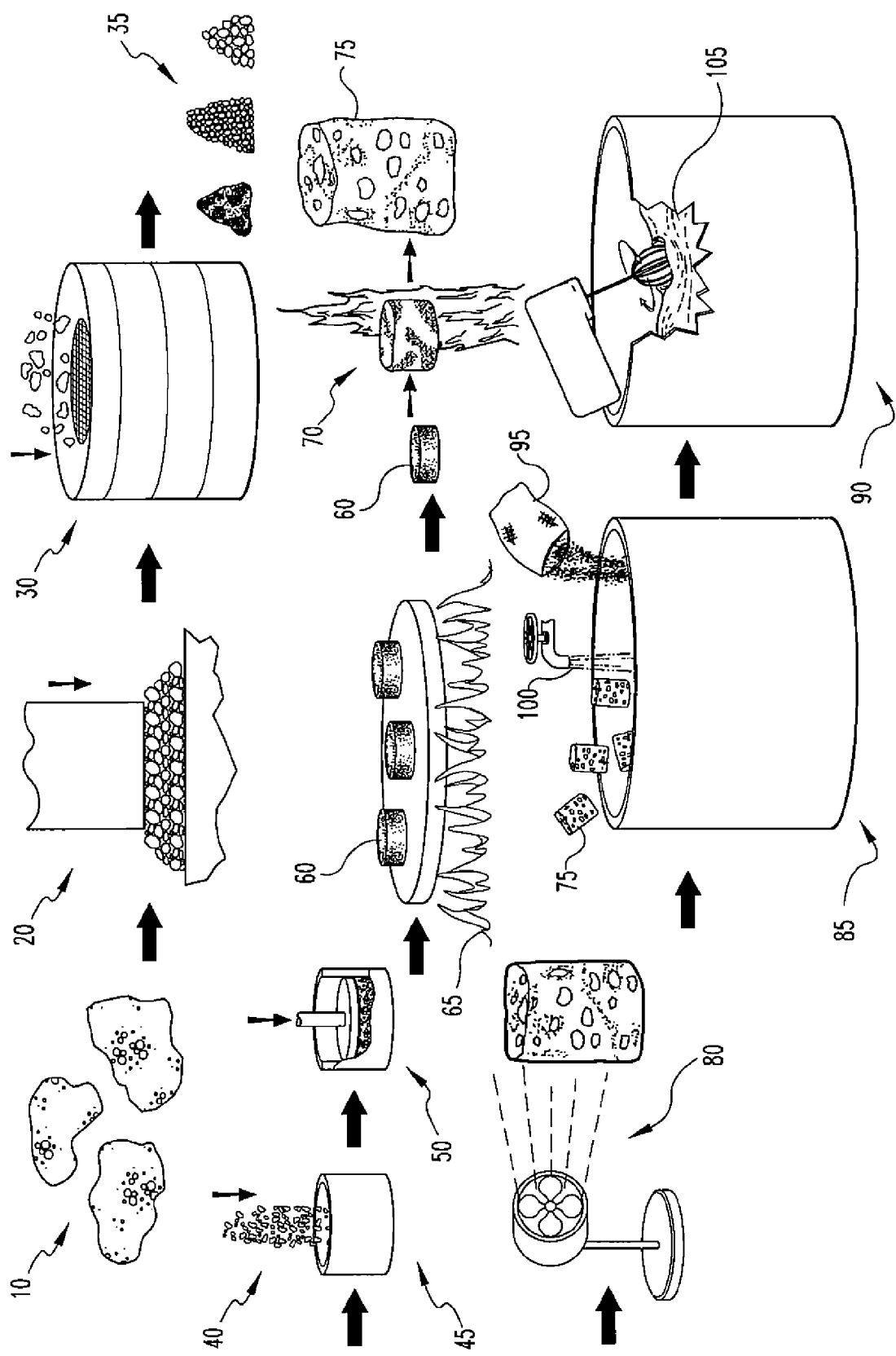

FOAMED GLASS CERAMIC COMPOSITE MATERIALS AND A METHOD FOR PRODUCING THE SAME

TECHNICAL FIELD

The invention relates generally to the field of ceramic materials and specifically, to a composite ceramic material including a foamed glass or foamed silaceous slag portion and a cemetitious, concrete, gypsum or other ceramic portion, and method of making the same.

BACKGROUND

Foamed glass is an established lightweight ceramic material. Typically, foamed glass is made in one of two ways. The first way involves preparing a stable foam from water and foaming agent, preparing a wet mixture or slurry of solid components (where cement is the main substance), quick mixing the foam and the slurry, filling molds with prepared the mixed foam/slurry, and firing the same. The second way to make foamed glass involves making use of the property of some materials to evolve a gas when heated. A foamed glass material may be prepared by mixing crushed vitreous particles and a foaming agent (such as $CaCO_3$ or $CaSO_4$), placing the mixture in a mold, heating the mold (such as by passing the mold through a furnace) to a foaming temperature, and cooling the mold to produce foamed glass bodies.

Slag is a nonmetallic byproduct of metallurgical operations. Slags typically consist of calcium, magnesium, and aluminum silicates in various combinations. Iron and steel slags are byproducts of iron and steel production. For example, an iron blast furnace is typically charged with iron ore, fluxing agents (such as limestone or dolomite) and coke (as fuel and reducing agent). Iron ore is typically a mixture of iron oxides, silica, and alumina. When sufficiently heated, molten slag and iron are produced. Upon separation of the iron, the slag is left over. The slag occurs as a molten liquid melt and is a complex solution of silicates and oxides that solidifies upon cooling.

The physical properties of the slag, such as its density, porosity, mean particle size, particle size distribution, and the like are affected by both its chemical composition and the rate at which it was cooled. The types of slag produced may thus conveniently be classified according to the cooling method used to produce them—air cooled, expanded, and granulated. Each type of slag has different properties and, thus, different applications.

While useful as insulation, roadway fill and abrasive materials, foamed glass bodies (with or without foamed slag), are typically unsuitable for use as lightweight filler due to cost and their propensity to hydrate and expand. Thus, there remains a need for an easily produced foamed glass material that is more resistant to expansion from hydration and/or more easily aged. The present invention addresses this need.

SUMMARY

The technology discussed below relates to manufactured composite materials, such as acoustic tile and manufactured stone, from foamed glass and (typically gypsum based) cementitious or other ceramic materials, and the method for making the same. One object of the present invention is to provide an improved foamed glass-containing material. Related objects and advantages of the present invention will be apparent from the following description.

BRIEF DESCRIPTION OF THE DRAWINGS

FIG. 1 is a schematic view of a first embodiment of a process for making foamed glass composites.

DETAILED DESCRIPTION OF THE PREFERRED EMBODIMENTS

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the claimed technology as illustrated therein being contemplated as would normally occur to one skilled in the art to which the claimed technology relates.

Vitreous materials, such as soda-lime-silica glasses and metallurgical byproduct slags, are typically foamed through a gasification processes to yield a typically predominately vitreous, typically silaceous resultant cellular product. Typically, a foaming precursor is predominately vitreous or non-crystalline prior to the foaming process, since a glassy precursor slag material typically has a viscosity at temperature that is convenient to the foaming process. More typically, the vitreous starting material will have a traditional soda-lime-silica glass composition, but other compositions, such as peralkaline slag or other slag compositions may be foamed as well. For example, a peraluminous slag with significant alkali and alkaline earth oxides may also be utilized. After the vitreous precursor is foamed, the foamed glass is physically combined with cement to form a composite material suitable for building or structural applications or the like.

Referring to FIG. 1, in the case of slagaceous precursor materials 10, the slag is typically predominately vitreous in character, and more typically has a maximum 40% by volume crystalline material. The slag is typically initially crushed 20 and sized 30 to approximately 10 microns median particle size, more typically at least 90 percent of all particles are less than 75 microns.

If the crushed and/or powdered slag 35 is dry, water is added to the powdered slag 35 to about 0.1 to about 0.5% (by mass). Alternately, if no water is added, limestone or other solid foaming agent may be added (less than 2 percent by mass). The mixture 40 is then formed 45, 50 into pellets 60 (typically between 0.05 and 1 cubic centimeter), preheated 65 (to no more than within 25° C. of the dilatometric softening point) and then the preheated pellets 60 are passed through a high temperature zone 70, such as one generated by a rotary kiln or a flame (contained in a ceramic or refractory metal tube). The residence time in the zone is short, typically about 0.5 to about 10 seconds, and the temperature is high (adiabatic flame temperature in excess of 1300° C.). In the case of a flame, the thermal energy provided to the material by the direct flame enables a change of state reaction in the foaming agent and the resulting gas will force the now viscous matter to foam. The foamed pellets 75 or foamed media are air quenched 80 below the dilatometric softening point of the material, and then allowed to dry by slow cooling.

The foamed media 75 typically have a relative volume expansion in excess of three fold, and more typically the volume expansion is as high as 10 fold or greater. This process results in individual, low-density (specific gravity less than 0.3) foamed media 75 with a median pore size in the range of 0.1 to 2 mm.

Composite materials may be prepared by mixing 85, 90 the foamed slag 75 with Portland cement 95; at least two types of composite materials may be made according to this technique. A first composite material may be prepared by mixing 85, 90 a thin mixture of cement 95 with foamed media 75, wherein the foamed media 75 comprises at least 85 volume percent of the total cement/other aggregate. The foamed media 75 are typically incorporated into the cement 95 (and aggregates, if needed) after the water 100 has been added. The resulting mixture 105 acts as a very viscous material and is pressure or gravity formed into a slab (or other coherent shape) or direct cast into a prefabricated form. The shape or form is then allowed to set. The resulting composite material sets up to be a rigid, relatively lightweight (specific gravity <0.75) material with surface properties typical of Portland cements. Chemicals and finishing systems compatible with Portland cement can be used in conjunction with this material.

A second composite material is formed as a mixture 105 of cement with typically less than 50 volume percent foamed slag media 75. The media 75 is typically dry mixed with cement 95 prior to water additions 100. The mixture 105 is then prepared as common cement. Additional aggregates may be incorporated as per common practice. This second composite material has a very high strength; the composite compressive strength is typically at least 25% higher per unit mass than is that of the identical cement prepared without the foamed slag addition. It can be used in any application compatible with Portland cement.

A third composite material is formed as aqueous slurry mixture 105 comprised of gypsum 95 with typically less than 50 percent by volume foamed glass or slag. The media 75 are typically added to the gypsum 95 after the material is slurried 90. Additional binders, fillers and setting agents may be added per common practice. The resulting material has a very low density and high acoustic absorption. There are no chemical compatibility limitations on the extent of foamed glass additions. Any limitations typically arise from strength considerations and other physical properties.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of making a foamed glass composite, comprising the steps of:
   a) crushing a partially vitreous precursor;
   b) sizing the crushed partially vitreous precursor to segregate an amount of crushed particles of a predetermined size;
   c) mixing the sized partially vitreous precursor aggregate with limestone as a foaming agent to yield precursor particles;
   d) preheating the precursor particles to a temperature about 25 degrees Celsius below their dilatometric softening point;
   e) rapidly passing the preheated particles through a high-temperature region of at least about 1300 degrees Celsius to foam the particles;
   f) air quenching the foamed particles; and
   g) mixing the foamed particles with cementitious material and water to form a composite material;
   wherein during d) the particles reside in the high-temperature region for at least 0.5 seconds and less than 10 seconds;
   wherein the foamed particles comprises at least 85 volume percent of the total composite material;
   wherein the composite material has a specific gravity of less than 0.75; and
   wherein the composite material has the surface properties of the cementitious material.

2. The method of claim 1 further comprising curing the foamed partially vitreous precursor, cementitious and water mixture.

3. The method of claim 1 wherein the partially vitreous precursor is substantially silaceous.

4. The method of claim 1 further comprising after b) and before c), hydrating the amount of crushed partially vitreous precursor particles.

5. The method of claim 1 wherein the partially vitreous precursor is a metallurgical byproduct slag.

6. The method of claim 1 wherein the high temperature region is a rotary kiln.

7. The method of claim 1 wherein the cementitious material is Portland cement.

8. The method of claim 1 wherein the high temperature region is a flame.

9. A method of making a foamed glass composite, comprising the steps of:
   a) crushing slag;
   b) sizing the crushed slag to segregate an amount of crushed slag particles of a predetermined size;
   c) mixing the crushed slag with a finite amount of not more than two mass percent limestone foaming agent to yield a precursor material;
   d) pelletizing the precursor material to form a plurality of pellets;
   e) preheating the pellets;
   f) passing the preheated pellets through a high-temperature flame to foam the pellets into foamed slag;
   g) air quenching the foamed slag;
   h) cooling the foamed slag;
   i) mixing the foamed slag with Portland cement and water to form a composite material; and
   i) curing the foamed slag, Portland cement and water mixture;
   wherein the flame temperature is at least about 1300° C.;
   wherein the pellets are preheated to about 25° C. below their dilatometric softening point;
   wherein the pellets have a volume of between about 0.05 and about 1 cubic centimeter; and
   wherein the pellets reside in the flame for between about 0.5 to about 10 seconds.

10. The method of claim 9 wherein the composite material is prepared by mixing a thin mixture of cement with foamed slag, wherein the foamed slag comprises at least 85 volume percent of the total volume of composite material.

11. The method of claim 9 wherein the composite material is prepared by mixing cement with foamed slag, wherein the foamed slag comprises less than about 50 volume percent of the total volume of composite material.

12. A method of foaming slag, comprising the steps of:
   a) crushing slag;
   b) sizing the crushed slag to segregate an amount of crushed slag particles of a predetermined size;
   c) pelletizing the amount of crushed slag particles with a foaming agent to form a plurality of pellets;
   d) preheating the pellets;
   e) passing the preheated pellets through a high-temperature zone to foam the pellets into foamed slag;
   f) air quenching the foamed; and
   g) cooling the foamed slag;
   wherein the foaming agent is limestone;
   wherein the zone temperature is at least about 1300° C.;
   wherein the pellets are preheated to about 25° C. below their dilatometric softening point;
   wherein the pellets have a volume of between about 0.05 and about 1 cubic centimeter; and
   wherein the pellets reside in the high-temperature zone for between about 0.5 to about 10 seconds.

13. The method of claim 12 wherein the high temperature zone is within a rotary kiln.

* * * * *